United States Patent
Nishimoto

(10) Patent No.: US 10,386,498 B2
(45) Date of Patent: Aug. 20, 2019

(54) BOOM ATTITUDE DETECTION DEVICE

(71) Applicant: TADANO LTD., Kagawa (JP)

(72) Inventor: Shoji Nishimoto, Kagawa (JP)

(73) Assignee: TADANO LTD., Kagawa (JP)

(*) Notice: Subject to any disclaimer, the term of this patent is extended or adjusted under 35 U.S.C. 154(b) by 256 days.

(21) Appl. No.: 15/520,916

(22) PCT Filed: Oct. 28, 2015

(86) PCT No.: PCT/JP2015/005415
§ 371 (c)(1),
(2) Date: Apr. 21, 2017

(87) PCT Pub. No.: WO2016/067607
PCT Pub. Date: May 6, 2016

(65) Prior Publication Data
US 2017/0336518 A1    Nov. 23, 2017

(30) Foreign Application Priority Data
Oct. 31, 2014    (JP) .................................. 2014-222337

(51) Int. Cl.
| | |
|---|---|
| *G01S 19/53* | (2010.01) |
| *B66C 13/46* | (2006.01) |
| *B66C 23/90* | (2006.01) |
| *G01S 19/14* | (2010.01) |

(52) U.S. Cl.
CPC .............. *G01S 19/53* (2013.01); *B66C 13/46* (2013.01); *B66C 23/90* (2013.01); *G01S 19/14* (2013.01)

(58) Field of Classification Search
CPC ......... G01S 19/14; G01S 19/53; B66C 13/46; B66C 17/04; B66C 23/90
USPC ........................................................ 342/352
See application file for complete search history.

(56) References Cited

FOREIGN PATENT DOCUMENTS

| | | |
|---|---|---|
| JP | 55-080691 | 6/1980 |
| JP | 2006-044932 | 2/2006 |

OTHER PUBLICATIONS

Jan. 12, 2016, International Search Report issued for PCT/JP2015/005415.

*Primary Examiner* — Dao L Phan
(74) *Attorney, Agent, or Firm* — Paratus Law Group, PLLC

(57) ABSTRACT

A boom attitude detection device is equipped with: a GPS device that measures the position of the leading end of the boom; attitude detectors and that detect the attitude of the boom; and a calculation device. If the positioning reliability of the GPS device is high, the calculation device determines a correction value for correcting detection values of the attitude detectors to the attitude of the boom determined from the positioning value of the GPS device. If the positioning reliability of the GPS device is low, the calculation device corrects the detection values of the attitude detectors using correction values and determines the attitude of the boom.

4 Claims, 7 Drawing Sheets

BOOM LENGTH TABLE

| Wk | L₁ | ··· Lᵢ ··· | L₁ |
|---|---|---|---|
| θ₁ | ΔL₁₁ₖ | ············ | ΔL₁₁ₖ |

| W₁ | L₁ | ··· Lᵢ ··· | L₁ |
|---|---|---|---|
| θ₁ | ΔL₁₁₁ | ············ | ΔL₁₁₁ |
| ⋮ θⱼ ⋮ | ⋮ | ΔLᵢⱼ₁ | ⋮ |
| θ_J | ΔL₁J₁ | ············ | ΔL_iJ₁ |

ΔL_IJK

ELEVATION ANGLE TABLE

| Wk | L₁ | ··· Lᵢ ··· | L₁ |
|---|---|---|---|
| θ₁ | ΔL₁₁ₖ | ············ | Δθ_i1K |

| W₁ | L₁ | ··· Lᵢ ··· | L₁ |
|---|---|---|---|
| θ₁ | Δθ₁₁₁ | ············ | Δθ_i11 |
| ⋮ θⱼ ⋮ | ⋮ | Δθ_ij1 | ⋮ |
| θ_J | Δθ_1J1 | ············ | Δθ_iJ1 |

Δθ_IJK

*FIG. 4*

BOOM ATTITUDE DETECTION DEVICE

CROSS REFERENCE TO PRIOR APPLICATION

This application is a National Stage Patent Application of PCT International Patent Application No. PCT/JP2015/005415 (filed on Oct. 28, 2015) under 35 U.S.C. § 371, which claims priority to Japanese Patent Application No. 2014-222337 (filed on Oct. 31, 2014), which are all hereby incorporated by reference in their entirety.

TECHNICAL FIELD

The present invention relates to a boom attitude detection apparatus, and more specifically, to a boom attitude detection apparatus for calculating an attitude of a boom of a crane by means of a Global Positioning System (GPS).

BACKGROUND ART

A large-sized crane has a long boom and the boom bends greatly. Accordingly, a large error arises when an attitude of the boom is detected by a conventional length detector and/or angle detector. Thus, calculating a boom attitude by means of a GPS is proposed (see, Patent Literature (hereinafter, abbreviated as PTL) 1, for example).

However, calculating a boom attitude by means of a GPS includes a problem that a boom attitude cannot be detected if radio waves from GPS satellites are interrupted. When a boom attitude cannot be detected, a safety apparatus such as an overload prevention device that utilizes a detected boom attitude does not function, and thus crane operation has to be stopped.

CITATION LIST

Patent Literature

PTL 1
Japanese Patent Application Laid-Open No. 2006-44932

SUMMARY OF THE INVENTION

Problems to be Solved by the Invention

It is therefore an object of the present invention to provide a boom attitude detection apparatus capable of calculating a boom attitude even in a case where a GPS device is in poor condition to receive a radio wave.

Solutions to Problems

A boom attitude detection apparatus of a first aspect of the present invention is a boom attitude detection apparatus that calculates an attitude of a boom of a crane, the boom attitude detection apparatus including: a GPS device that performs positioning of a position of a leading end of the boom; an attitude detector that detects an attitude of the boom; and a calculation device that receives a positioning value of the GPS device and a detection value of the attitude detector, in which: in a case where positioning reliability of the GPS device is high, the calculation device calculates a correction value for correcting a detection value of the attitude detector to an attitude of the boom to be calculated based on a positioning value of the GPS device, and in a case where positioning reliability of the GPS device is low, the calculation device corrects a detection value of the attitude detector by the correction value to calculate an attitude of the boom.

A boom attitude detection apparatus of a second aspect of the present invention is a boom attitude detection apparatus according to the first aspect of the present invention, in which: the calculation device stores therein a correction table in which a correction value per attitude of the boom is stored, and in a case where positioning reliability of the GPS device is high, the calculation device calculates a correction value for correcting a detection value of the attitude detector to an attitude of the boom to be calculated based on a positioning value of the GPS device, and updates, by the calculated correction value, a correction value within the correction table corresponding to a detection value of the attitude detector, and in a case where positioning reliability of the GPS device is low, the calculation device obtains a correction value corresponding to a detection value of the attitude detector from the correction table, and corrects a detection value of the attitude detector by the obtained correction value to calculate an attitude of the boom.

A boom attitude detection apparatus of a third aspect of the present invention is a boom attitude detection apparatus according to the second aspect of the present invention, in which: during calculation of an attitude of the boom, the calculation device obtains a correction value corresponding to a neighborhood of a detection value of the attitude detector from the correction table, interpolates the obtained correction value to calculate a correction value for a detection value of the attitude detector, and corrects a detection value of the attitude detector by the calculated correction value to calculate an attitude of the boom.

A boom attitude detection apparatus of a fourth aspect of the present invention is a boom attitude detection apparatus according to the first aspect of the present invention, further including: a load detector that detects a load applied to the boom, in which: the calculation device stores therein a correction table in which a correction value per attitude of the boom and load applied to the boom is stored, and in a case where positioning reliability of the GPS device is high, the calculation device calculates a correction value for correcting a detection value of the attitude detector to an attitude of the boom to be calculated based on a positioning value of the GPS device, and updates, by the calculated correction value, correction values within the correction table corresponding to detection values of the attitude detector and the load detector, and in a case where positioning reliability of the GPS device is low, the calculation device obtains correction values corresponding to detection values of the attitude detector and the load detector from the correction table, and corrects a detection value of the attitude detector by the obtained correction values to calculate an attitude of the boom.

A boom attitude detection apparatus of a fifth aspect of the present invention is a boom attitude detection apparatus according to the fourth aspect of the present invention, in which: during calculation of an attitude of the boom, the calculation device obtains correction values corresponding to neighborhoods of detection values of the attitude detector and the load detector from the correction table, interpolates the obtained correction values to calculate correction values for detection values of the attitude detector and the load detector, and corrects a detection value of the attitude detector by the calculated correction values to calculate an attitude of the boom.

A boom attitude detection apparatus of a sixth aspect of the present invention is a boom attitude detection apparatus according to any one of the second to fifth aspects of the present invention, in which: during calculation of an attitude of the boom, the calculation device determines reliability of the calculated attitude of the boom by whether or not the correction value obtained from the correction table is already updated.

A boom attitude detection apparatus of a seventh aspect of the present invention is a boom attitude detection apparatus according to any one of the first to sixth aspects of the present invention, in which: the calculation device always corrects a detection value of the attitude detector by the correction value to calculate an attitude of the boom regardless of reliability of positioning by the GPS device.

Effects of the Invention

According to the first aspect of the present invention, an attitude of a boom is calculated by correcting a detection value of an attitude detector, so that the attitude of the boom can be calculated even in a case where a GPS device is in poor condition to receive a radio wave and positioning reliability is low.

According to the second aspect of the present invention, since a correction value is changed based on an attitude of a boom, the attitude of the boom is calculated with high accuracy.

According to the third aspect of the present invention, a correction value for an actual attitude of the boom is calculated by interpolation of a correction value obtained from the correction table, so that the correction value can be continuously changed depending on changes in the actual attitude of the boom, and attitudes of the boom can be continuously calculated.

According to the forth aspect of the present invention, since a correction value is changed depending on an attitude of a boom and/or on a load, the attitude of the boom can be calculated with high accuracy.

According to the fifth aspect of the present invention, correction values for an actual attitude of the boom and an actual load are calculated a by interpolation of correction values obtained from the correction table, so that correction values can be continuously changed depending on changes in the actual attitude of the boom and the actual load, and attitudes of the boom can be continuously calculated.

According to the sixth aspect of the present invention, outputting the reliability of the calculated attitude of the boom makes it possible to prompt operators to suitable operations and to appropriately control other devices.

According to the seventh aspect of the present invention, a detection value of the attitude detector is always corrected to calculate an attitude of the boom regardless of reliability of positioning by the GPS device, so that an attitude of the boom can continuously be calculated even before and after change of reliability of positioning by the GPS device.

BRIEF DESCRIPTION OF DRAWINGS

FIG. 4 illustrates correction table 44.

DESCRIPTION OF EMBODIMENTS

In the following, an embodiment of the present invention will be described with reference to the drawings.

Figure 1:
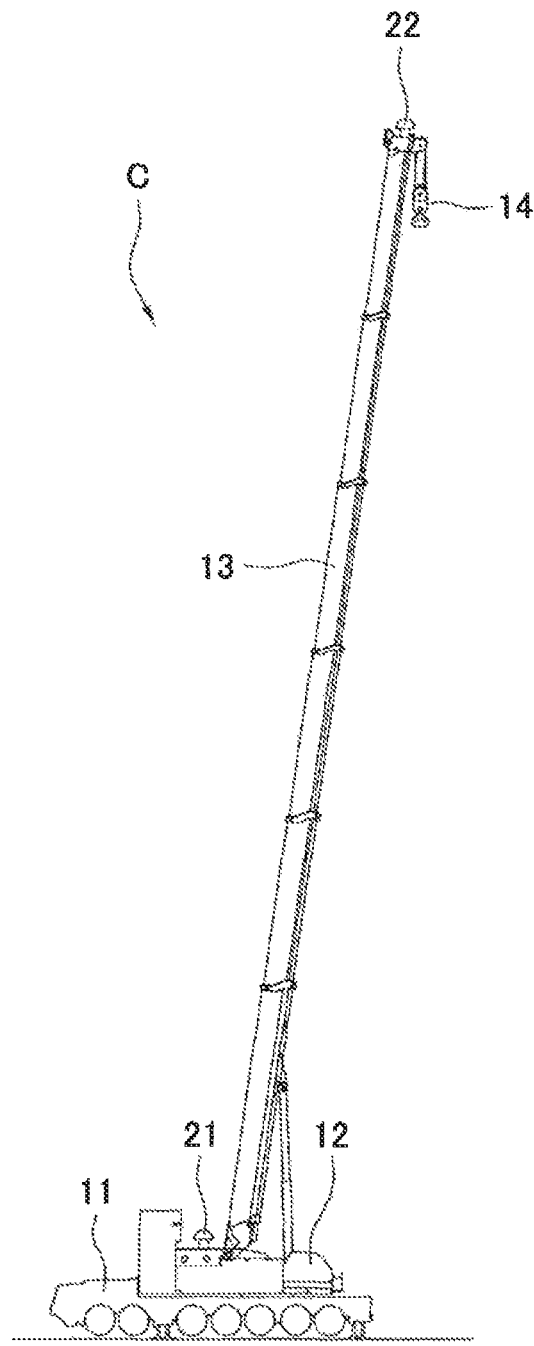
FIG. 1 is a side view of mobile crane C.

Boom attitude detection apparatus A according to one embodiment of the present invention is an apparatus that is provided on a large-sized mobile crane C as illustrated in FIG. 1, for example, and that calculates an attitude of boom 13. Boom attitude detection apparatus A of the present embodiment is applicable to various cranes, and is thus applicable not only to a mobile crane but also to a fixed crane. A mobile crane is taken as an example in the following description.

(Mobile Crane C)

To begin with, the basic structure of the mobile crane C will be described.

Reference numeral 11 in FIG. 1 indicates a traveling chassis provided with wheels for traveling. Slewing base 12 is mounted on traveling chassis 11 in such a manner as to be able to slew 360 degrees in the horizontal plane by a slewing motor.

Boom 13 is attached to slewing base 12 such that boom 13 can be freely elevated and lowered. A base end of boom 13 is pivotally supported by a pin on slewing base 12. An elevating cylinder is attached between boom 13 and slewing base 12. Boom 13 is elevated when the elevating cylinder is extended, and lowered when the elevating cylinder is retracted. Boom 13 is configured to be telescopic, and extends and retracts by a telescopic cylinder.

A wire rope provided with hook 14 is suspended from a leading end of boom 13, and is guided along boom 13 to slewing base 12 and wound around a winch. The winch is driven to rotate forward and reverse by a hoist motor to wind and pay out the wire rope, so as to be able to move hook 14 up and down.

Combination of slewing of slewing base 12; elevating, lowering, extending, and retracting of boom 13; and moving up and down of hook 14 allows lifting and lowering of a load in a three-dimensional space.

Slewing base 12 and the leading end of boom 13 of mobile crane C are provided with GPS antennae 21, 22, respectively. GPS antenna 21 provided on slewing base 12 is referred to as base station GPS antenna 21, and GPS antenna 22 provided on the leading end of boom 13 is referred to as mobile station GPS antenna 22. In this respect, although an attachment position of base station GPS antenna 21 is not specifically limited as long as it is attached to slewing base 12, base station GPS antenna 21 is preferably attached to a place which is open towards the sky as much as possible.

As described below, through analysis of radio waves as received by GPS antennae 21, 22 from GPS satellites, a position of the leading end of boom 13 can be calculated as a relative position of mobile station GPS antenna 22 with respect to base station GPS antenna 21. Based on the calculated position of the leading end of boom 13, an attitude of boom 13, such as a boom length and an elevation angle, can be calculated.

In the meantime, depending on circumstances around mobile crane C and positions of the GPS satellites, conditions to receive radio waves from the GPS satellites may sometimes be poor. Moreover, since base station GPS antenna 21 is provided on slewing base 12, a GPS satellite may go behind boom 13. This makes it impossible to receive radio waves from the sufficient number of GPS satellites (four or more GPS satellites, for example), so that positioning reliability is reduced or even positioning is made impossible. Boom attitude detection apparatus A of the present embodiment is characterized in that an attitude of boom 13 can be calculated even in poor condition to receive radio waves from GPS.

(Boom Attitude Detection Apparatus A)

Next, the configuration of boom attitude detection apparatus A is described.

Figure 2:
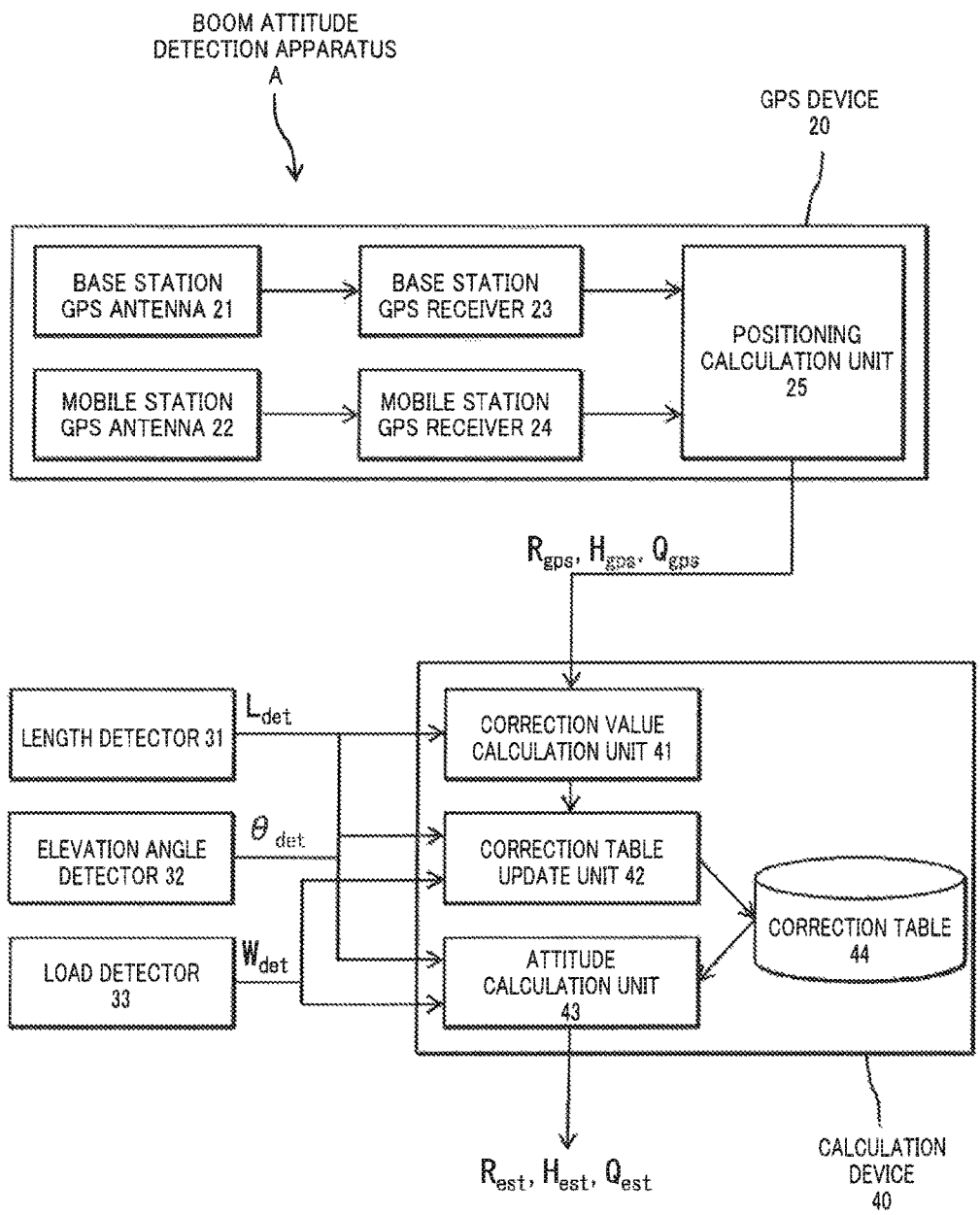
FIG. 2 is a block diagram of boom attitude detection apparatus A according to one embodiment of the present invention.

As illustrated in FIG. 2, boom attitude detection apparatus A of the present embodiment includes GPS device 20, various detectors 31 to 33, and calculation device 40.

GPS device 20 has a function of positioning of a position of the leading end of boom 13 with relative positioning. GPS device 20 includes the aforementioned GPS antennae 21, 22; GPS receivers 23, 24 respectively connected to GPS antennae 21, 22; and positioning calculation unit 25. In this respect, while GPS antennae 21, 22 are attached to slewing base 12 and boom 13 of mobile crane C, attachment positions of GPS receivers 23, 24 are not specifically limited. By way of example, GPS receivers 23, 24 are attached to an operator's cab of mobile crane C.

Base station GPS antenna 21 receives radio waves from a plurality of GPS satellites and input these radio waves to base station GPS receiver 23. Base station GPS receiver 23 analyzes the radio waves received from the plurality of GPS satellites and outputs navigation data and observation data. In the same way, mobile station GPS antenna 22 receives radio waves from a plurality of GPS satellites and input these radio waves to mobile station GPS receiver 24. Mobile station GPS receiver 24 analyzes the radio waves received from the plurality of GPS satellites and outputs navigation data and observation data. Navigation data denote here data required for positioning such as orbital information of GPS satellites and an ionospheric delay coefficient. Observation data denote data such as a pseudo range and Doppler frequency calculated from radio wave receipt times, and signal intensity.

Positioning calculation unit 25 is a computer including a CPU, memory, and/or the like. Positioning calculation unit 25 calculates a relative position of mobile station GPS antenna 22 with respect to base station GPS antenna 21 based on navigation data and observation data received from GPS receivers 23, 24.

Figure 3:
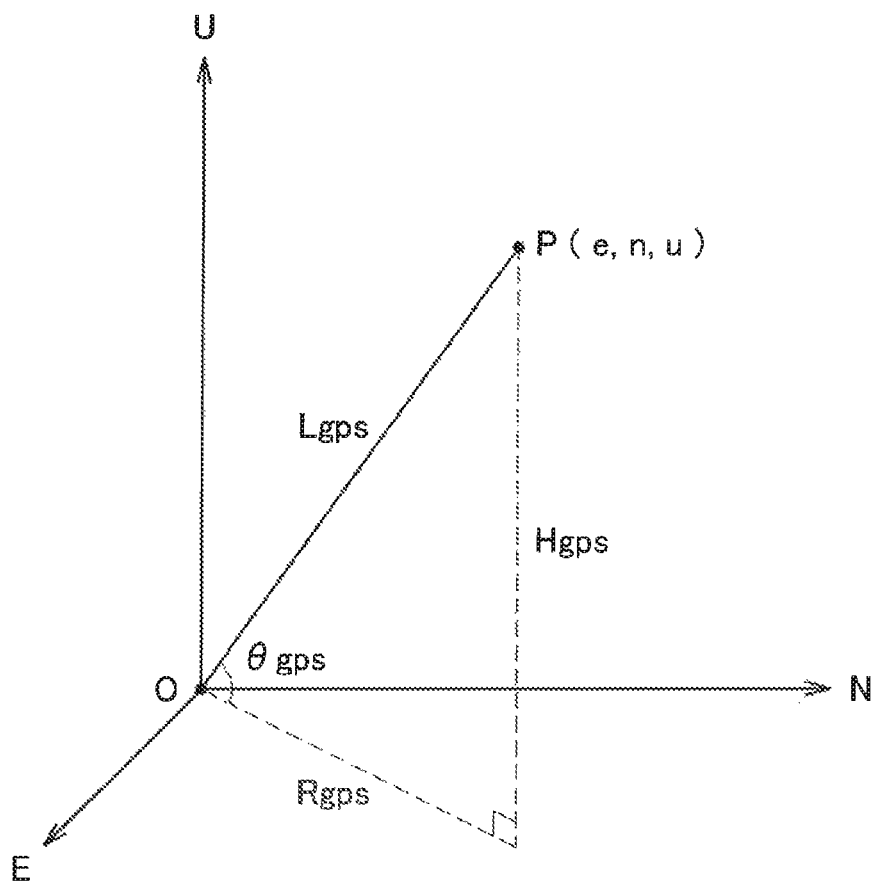
FIG. 3 illustrates an ENU coordinate system.

Positioning calculation unit 25 calculates a positioning value in an ENU coordinate system as illustrated in FIG. 3, for example. The ENU coordinate system as used herein refers to a coordinate system that represents a position using three elements of East, North, and Up (height). In the ENU coordinate system of FIG. 3, origin O (0, 0, 0) represents a position of base station GPS antenna 21, and point P (e, n, u) represents a position of mobile station GPS antenna 22. In this way, positioning calculation unit 25 calculates a position of mobile station GPS antenna 22, namely, position P (e, n, u) of the leading end of boom 13.

It is to be noted that positions of GPS antennae 21, 22 may be different from positions suitable for representation of an attitude of boom 13. By way of example, an elevation center at a base end of boom 13 instead of a position of base station GPS antenna 21 and a rotation center at a sheave provided at the leading end of boom 13 instead of a position of mobile GPS antenna 22 may sometimes be suitable. In this case, the elevation center at the base end of boom 13 is calculated from the position of base station GPS antenna 21 and based on the dimensions of mobile crane C and this elevation center is defined as origin O, and further, the rotation center at the sheave provided at the leading end of boom 13 is calculated from the position of mobile station GPS antenna 22 and this rotation center is defined as point P. Positioning value P suitable for representation of an attitude of boom 13 can thus be calculated.

Positioning calculation unit 25 calculates distance $R_{gps}$ in a horizontal plane and distance $H_{gps}$ in the vertical direction between points O and P by applying a coordinate transformation from the ENU coordinate system to a cylindrical coordinate system in accordance with the following Equation 1. Positioning calculation unit 25 then outputs, as positioning value P of the leading end of boom 13, distance $R_{gps}$ in the horizontal plane and distance $H_{gps}$ in the vertical direction between points O and P.

(Equation 1)

$$R_{gps} = \sqrt{e^2 + n^2}$$ [1]

$$H_{gps} = u$$

Positioning calculation unit 25 also outputs reliability $Q_{gps}$ of positioning in addition to positioning value ($R_{gps}$, $H_{gps}$). Reliability $Q_{gps}$ is expressed as true (1), for example, in a case where positioning reliability is high and is expressed as false (0) in a case where positioning reliability is low. The case where positioning reliability is low includes the case where positioning is impossible. The way of calculation of positioning reliability is not especially limited. By way of example, in the case of positioning calculation using carrier waves sent from GPS satellites, positioning reliability may be considered to be high when certainty of a phase offset estimate of a carrier wave that is an integer multiple and is generally called fixed solution is high.

Boom attitude detection apparatus A has length detector 31 for detecting a length of boom 13, elevation angle detector 32 for detecting an elevation angle of boom 13, and load detector 33 for detecting a load applied to boom 13. In this respect, length detector 31 and elevation angle detector 32 correspond to "attitude detector" appearing in the CLAIMS section. Length detector 31 and elevation angle detector 32 may hereinafter be referred to simply as attitude detectors 31, 32. As the attitude detector, a detector that directly detects an attitude of boom 13 is used as an alternative to GPS device 20. With this function, the attitude detectors may have other configurations than the configuration which includes length detector 31 and elevation angle detector 32.

The configuration of length detector 31 is not particularly limited, and an example thereof may be a configuration in which an end of a cord is secured to the leading end of boom 13 and a rotation angle of a cord reel is read by a potentiometer. The configuration of elevation angle detector 32 also is not particularly limited, and an example thereof may be a pendulum-type angular measuring device constructed by attaching a pendulum to a potentiometer. The configuration of load detector 33 also is not particularly limited, and examples thereof may include a tension detector that detects a weight of a suspended load from a tension of a wire rope from which hook 14 is suspended, and a configuration in which a load is detected from hydraulic pressure within a telescopic cylinder of boom 13.

Calculation device 40 is a computer including a CPU, memory, and the like. Calculation device 40 executes programs stored in the memory, so that correction value calculation unit 41, correction table update unit 42, and attitude calculation unit 43 are actualized. In addition, correction table 44 is stored in the memory of calculation device 40. Calculation device 40 receives positioning value ($R_{gps}$, $H_{gps}$) and reliability $Q_{gps}$ from GPS device 20, and detection values, namely, boom length $L_{det}$, elevation angle $\theta_{det}$, and load $W_{det}$ from respective detectors 31 to 33.

Correction value calculation unit 41 receives positioning value ($R_{gps}$, $H_{gps}$) and reliability $Q_{gps}$ from GPS device 20, and boom length $L_{det}$ from length detector 31 and elevation angle $\theta_{det}$ from elevation angle detector 32. Correction value calculation unit 41 performs the following process when positioning reliability of GPS device 20 is high ($Q_{gps}=1$). In the meantime, correction value calculation unit 41 does not perform the process when positioning reliability of GPS device 20 is low ($Q_{gps}=0$).

Correction value calculation unit 41 first calculates an attitude of boom 13, that is, boom length $L_{gps}$ and elevation angle $\theta_{gps}$ based on positioning value ($R_{gps}$, $H_{gps}$) of GPS device 20 in accordance with the following Equation 2.

(Equation 2)
$$L_{gps} = \sqrt{H_{gps}^2 + R_{gps}^2} \qquad [2]$$
$$\theta_{gps} = \tan^{-1}\frac{H_{gps}}{R_{gps}}$$

Boom 13 of large-sized mobile crane C bends due to a dead weight and/or a weight of a suspended load. In particular, a difference in position of the leading end of boom 13 is large compared to the leading end of unbent boom 13. GPS device 20 performs positioning of a position of the leading end of boom 13, and accordingly attitude ($L_{gps}$, $\theta_{gps}$) of boom 13 calculated from the positioning value of GPS device 20 denotes a value in which bending is taken into account and which approximates to the actual attitude of boom 13. In contrast, only a little effect of bending of boom 13 is taken into account in detection values ($L_{det}$, $\theta_{det}$) of attitude detectors 31, 32, and thus detection values ($L_{det}$, $\theta_{det}$) may deviate from the actual attitude of boom 13.

Thus, correction value calculation unit 41 calculates, as in Equation 3, differences ($\Delta L$, $\Delta\theta$) between attitude ($L_{gps}$, $\theta_{gps}$) of boom 13 to be calculated from a positioning value of GPS device 20 and detection values ($L_{det}$, $\theta_{det}$) of attitude detectors 31, 32. These differences ($\Delta L$, $\Delta\theta$) are generated due to bending of boom 13. Thus, if these differences ($\Delta L$, $\Delta\theta$) are utilized, an actual attitude of boom 13 in which bending of boom 13 is taken into account can be calculated from detection values ($L_{det}$, $\theta_{det}$) of attitude detectors 31, 32. In other words, the differences ($\Delta L$, $\Delta\theta$) are correction values ($\Delta L$, $\Delta\theta$) for correcting detection values ($L_{det}$, $\theta_{det}$) of attitude detectors 31, 32 to attitude ($L_{gps}$, $\theta_{gps}$) of boom 13 to be calculated from a positioning value of GPS device 20.

(Equation 3)
$$\Delta L = L_{gps} - L_{det} \qquad [3]$$

$$\Delta\theta = \theta_{gps} - \theta_{det}$$

Correction values ($\Delta L$, $\Delta\theta$) calculated from Equation 3 are correction values for the attitude of boom 13 and the load at the time of detection by GPS device 20 and attitude detectors 31, 32. Change in attitude of boom 13 and in load also changes the amount of bending of boom 13, so that correction values ($\Delta L$, $\Delta\theta$) are changed.

Accordingly, calculation device 40 stores therein a correction table 44 in which correction values per attitude of boom 13 and load applied to boom 13 are stored. As illustrated in FIG. 4, correction table 44 includes a table for boom lengths and a table for elevation angles. Each of the tables is a three-dimensional table with three indices of boom length $L_i$ (i=1, 2, . . . , I), elevation angle $\theta_j$ (j=1, 2, . . . , J), and load $W_k$ (k=1, 2, . . . , K). Each correction table is also referred to as a three-dimensional arrangement with three indices of boom length $L_i$, elevation angle $\theta_j$, and load $W_k$. An element in the boom length table is designated as $\Delta L_{ijk}$ and an element in the elevation angle table is designated as $\Delta\theta_{ijk}$. The subscripts of i, j, and k are the same as the subscripts of boom length $L_i$, elevation angle $\theta_j$, and load $W_k$. That is, correction values, where a boom length is $L_i$, an elevation angle is $\theta_j$, and a load is $W_k$, are designated as $\Delta L_{ijk}$ and $\Delta\theta_{ijk}$.

Correction table update unit 42 receives correction values ($\Delta L$, $\Delta\theta$) from correction value calculation unit 41, and detection values ($L_{det}$, $\theta_{det}$, $W_{det}$) from respective detectors 31 to 33. Correction table update unit 42 updates correction table 44 by performing the following process.

Update of correction table 44 may, for example, include simply updating, by correction values ($\Delta L$, $\Delta\theta$) calculated by correction value calculation unit 41, elements ($\Delta L_{abc}$, $\Delta\theta_{abc}$) among elements ($\Delta L_{ijk}$, $\Delta\theta_{ijk}$) in correction table 44 that are closest to detection values ($L_{det}$, $\theta_{det}$, $W_{det}$) of detectors 31 to 33. However, as described below, update of correction table 44 by more accurate values is possible by extrapolating correction values ($\Delta L$, $\Delta\theta$) calculated by correction value calculation unit 41 to calculate correction values of elements corresponding to the neighborhoods of detection values ($L_{det}$, $\theta_{det}$, $W_{det}$) of detectors 31 to 33, and updating using these correction values.

Correction table update unit 42 first searches indices ($L_i$, $\theta_j$, $W_k$) of correction table 44 for higher and lower values adjacent to detection values ($L_{det}$, $\theta_{det}$, $W_{det}$) of detectors 31 to 33. The higher and lower values adjacent to detection value $L_{det}$ of a boom length are hereinafter designated as $L_a$, $L_{a+1}$ ($L_a < L_{det} < L_{a+1}$). Higher and lower index values adjacent to detection value $\theta_{det}$ of an elevation angle are designated as $\theta_b$, $\theta_{b+1}$ ($\theta_b < \theta_{det} < \theta_{b+1}$). Higher and lower index values adjacent to detection value $W_{det}$ of a load are designated as $W_c$, $W_{c+1}$ ($W_c < W_{det} < W_{c+1}$).

Next, in accordance with Equation 4, by using values in correction table 44 before update, correction values ($\Delta L'$, $\Delta\theta'$) in the case of detection values ($L_{det}$, $\theta_{det}$, $W_{det}$) are calculated from eight correction values ($X_{abc}$, $X_{abc+1}$, $X_{ab+1c}$, $X_{ab+1c+1}$, $X_{a+1bc}$, $X_{a+1bc+1}$, $X_{a+1b+1c}$, $X_{a+1b+1c+1}$) corresponding to $L_a$, $L_{a+1}$, $\theta_b$, $\theta_{b+1}$, $W_c$, and $W_{c+1}$. In is to be noted that, in Equation 4, X' denotes correction value $\Delta L'$ or $\Delta\theta'$ calculated by interpolation of values in correction table 44, and $X_{ijk}$ denotes element $\Delta L_{ijk}$ or $\Delta\theta_{ijk}$ in correction table 44.

(Equation 4)
$$X' = \frac{(W_{c+1} - W_{det})A + (W_{det} - W_c)B}{W_{c+1} - W_c} \qquad [4]$$
$$A = \frac{(\theta_{b+1} - \theta_{det})C + (\theta_{det} - \theta_b)D}{\theta_{b+1} - \theta_b}$$
$$B = \frac{(\theta_{b+1} - \theta_{det})E + (\theta_{det} - \theta_b)F}{\theta_{b+1} - \theta_b}$$
$$C = \frac{(L_{a+1} - L_{det})X_{abc} + (L_{det} - L_a)X_{a+1bc}}{L_{a+1} - L_a}$$
$$D = \frac{(L_{a+1} - L_{det})X_{ab+1c} + (L_{det} - L_a)X_{a+1b+1c}}{L_{a+1} - L_a}$$
$$E = \frac{(L_{a+1} - L_{det})X_{abc+1} + (L_{det} - L_a)X_{a+1bc+1}}{L_{a+1} - L_a}$$
$$F = \frac{(L_{a+1} - L_{det})X_{ab+1c+1} + (L_{det} - L_a)X_{a+1b+1c+1}}{L_{a+1} - L_a}$$

Next, in accordance with Equation 5, correction values ($\Delta L$, $\Delta\theta$) calculated by correction value calculation unit 41 are extrapolated to calculate eight correction values $X_{ijk}$ corresponding to the neighborhoods of detection values $(L_{det}, \theta_{det}, W_{det})$ of detectors 31 to 33 within correction table 44, and correction table 44 is updated by these values. It is to be noted that, in Equation 5, X denotes correction value $\Delta L$ or $\Delta \theta$ calculated by correction value calculation unit 41, X' denotes correction value $\Delta L'$ or $\Delta \theta'$ calculated by interpolation of values in correction table 44, and $X_{ijk}$ denotes element $\Delta L_{ijk}$ or $\Delta \theta_{ijk}$ in correction table 44. In addition, $X_{ijk}$ on the right side of Equation 5 is a value before update, and $X_{ijk}$ on the left side is an updated value.

(Equation 5)

$$X_{ijk} = X_{ijk} + (X - X') \times \left|\frac{L_i - L_{det}}{L_{a+1} - L_a}\right| \times \left|\frac{\theta_j - \theta_{det}}{\theta_{b+1} - \theta_b}\right| \times \left|\frac{W_k - W_{det}}{W_{c+1} - W_c}\right| \quad [5]$$

Correction table 44 includes update flag $F_{ijk}$ for indicating whether or not each element is already updated. Update flag $F_{ijk}$ is set to True (1) in a case where an element is already updated, and is set to False (0) in a case where an element is not yet updated. Correction table update unit 42 updates correction values ($\Delta L_{ijk}$, $\Delta \theta_{ijk}$), and sets update flag $F_{ijk}$ corresponding to the updated element to "already updated."

Attitude calculation unit 43 receives detection values ($L_{det}$, $\theta_{det}$, $W_{det}$) from respective detectors 31 to 33. Attitude calculation unit 43 calculates an attitude of boom 13 by performing the following process.

Attitude calculation of boom 13 may, for example, include simply calculating an attitude of boom 13 by obtaining elements ($\Delta L_{abc}$, $\Delta \theta_{abc}$) closest to detection values ($L_{det}$, $\theta_{det}$, $W_{det}$) of detectors 31 to 33 from correction table 44 to correct detection values ($L_{det}$, $\theta_{det}$, $W_{det}$) of attitude detectors 31, 32 by the obtained correction values ($\Delta L_{abc}$, $\Delta \theta_{abc}$). However, as described below, calculation of an attitude of boom 13 with higher accuracy is possible by interpolating correction values obtained from correction table 44 to calculate correction values ($\Delta L'$, $\Delta \theta'$) in the case of detection values ($L_{det}$, $\theta_{det}$, $W_{det}$) so as to correct detection values ($L_{det}$, $\theta_{det}$) of attitude detectors 31, 32 by the calculated correction values ($\Delta L'$, $\Delta \theta'$), and by subsequently calculating an attitude of boom 13.

Attitude calculation unit 43 first searches indices ($L_i$, $\theta_j$, $W_k$) of correction table 44 for higher and lower values (La, La+1, $\theta$b, $\theta$b+1, Wc, Wc+1) adjacent to detection values ($L_{det}$, $\theta_{det}$, $W_{det}$) of detectors 31 to 33 to obtain eight corresponding correction values. Next, in accordance with Equation 4, the obtained correction values are interpolated to calculate correction values ($\Delta L'$, $\Delta \theta'$) for detection values ($L_{det}$, $\theta_{det}$, $W_{det}$).

Next, attitude calculation unit 43 corrects detection values ($L_{det}$, $\theta_{det}$) of attitude detectors 31, 32 by the calculated correction values ($\Delta L'$, $\Delta \theta'$) to calculate an attitude ($L_{est}$, $\theta_{est}$), as in Equation 6.

(Equation 6)

$$L_{est} = L_{det} + \Delta L' \quad [6]$$

$$\theta_{est} = \theta_{det} + \Delta \theta'$$

Attitude calculation unit 43 may output ($L_{est}$, $\theta_{est}$) as an attitude of boom 13 or may output other values converted from ($L_{est}$, $\theta_{est}$). By way of example, distance $R_{est}$ in the horizontal plane and distance $H_{est}$ in the vertical direction between the base end and the leading end of boom 13 may be calculated from boom length $L_{est}$ and elevation angle $\theta_{est}$ in accordance with Equation 7, and may then be output.

(Equation 7)

$$R_{est} = L_{est} \cos \theta_{est} \quad [7]$$

$$H_{est} = L_{est} \sin \theta_{est}$$

Attitude calculation unit 43 outputs not only attitude ($R_{est}$, $H_{est}$) of boom 13, but also reliability $Q_{est}$ of calculated attitude ($R_{est}$, $H_{est}$) of boom 13. Reliability $Q_{est}$ is expressed as True (1), for example, in a case where positioning reliability is high and is expressed as False (0) in a case where positioning reliability is low. Attitude calculation unit 43 determines from update flag $F_{ijk}$ whether or not correction values ($\Delta L_{ijk}$, $\Delta \theta_{ijk}$) obtained from correction table 44 during calculation of attitude ($R_{est}$, $H_{est}$) of boom 13 are already updated, and, if already updated, determines that reliability is high ($Q_{est}=1$) or, if not yet updated, determines that reliability is low ($Q_{est}=0$).

When a correction value obtained from correction table 44 is already updated, the correction value is a value based on positioning by GPS device 20, so that an attitude of boom 13 that is close to the actual attitude can be calculated. Accordingly, reliability $Q_{est}$ of calculated attitude ($R_{est}$, $H_{est}$) of boom 13 is high. In contrast, when a correction value obtained from correction table 44 is not yet updated, attitude ($R_{est}$, $H_{est}$) of boom 13 cannot be calculated based on positioning by GPS device 20, so that reliability $Q_{est}$ is low.

In the meantime, in a case where correction values calculated in a test, simulation, and/or the like are stored as default values in correction table 44, attitude ($R_{est}$, $H_{est}$) of boom 13 can be calculated with some high degree of accuracy even with correction values which are not yet updated. In contrast, in a case where default values of correction table 44 are, for example, zero, correction by correction values that are not yet updated is ineffective, and thus, detection values of attitude detectors 31, 32 are used as attitude ($R_{est}$, $H_{est}$) of boom 13 without being corrected, and as a result attitude detection is made less accurate.

In addition, continuing crane operations in a condition where GPS device 20 can perform positioning allows continuous update of correction table 44. Thus, the greater the crane operation time becomes, the more GPS device 20 learns suitable correction values to reduce the use of correction values that are not yet updated.

As described above, attitude calculation unit 43 calculates attitude ($R_{est}$, $H_{est}$) of boom 13, and outputs calculated attitude ($R_{est}$, $H_{est}$) of boom 13 and reliability $Q_{est}$ thereof. In this case, attitude calculation unit 43 corrects detection values ($L_{det}$, $\theta_{det}$) of attitude detectors 31, 33 to calculate attitude ($R_{est}$, $H_{est}$) of boom 13 not only when reliability $Q_{gps}$ of positioning by GPS device 20 is low, but also even when reliability $Q_{gps}$ of positioning is high. That is, attitude calculation unit 43 always corrects detection values ($L_{det}$, $\theta_{det}$) of attitude detectors 31, 33 to calculate attitude ($R_{est}$, $H_{est}$) of boom 13 regardless of reliability $Q_{gps}$ of positioning by GPS device 20.

It may also be possible that an attitude of boom 13 is calculated from a positioning value of GPS device 20 in a case where reliability $Q_{gps}$ of positioning is high, while it is calculated by correcting detection values of attitude detectors 31, 33 in a case where reliability $Q_{gps}$ of positioning is low. However, there is a possibility that thus changing the calculation process of an attitude of boom 13 in the middle of crane operations may cause discontinuity of calculation results. In contrast, in the present embodiment, attitudes of boom 13 are calculated by always correcting detection values of attitude detectors 31, 32, so that attitudes of boom 13 can continuously be calculated even before and after change in reliability $Q_{gps}$ of positioning by GPS device 20. Thus, calculated attitudes of boom 13 do not have any bad effect on other devices utilizing the calculated attitudes.

Attitude ($R_{est}$, $H_{est}$) of boom 13 and reliability $Q_{est}$ as output from calculation device 40 are input, for example, to other devices such as a boom attitude displaying device, overload prevention device, and/or the like. As for the boom attitude displaying device, it is possible to draw attention of operators to the reliability by displaying attitude ($R_{est}$, $H_{est}$) of boom 13 together with reliability $Q_{est}$. In addition, as for the overload prevention device, it is possible to change a control method of the device depending on reliability $Q_{est}$.

(Boom Attitude Detection Method)

Next, operations of boom attitude detection apparatus A are described.

Figure 5:
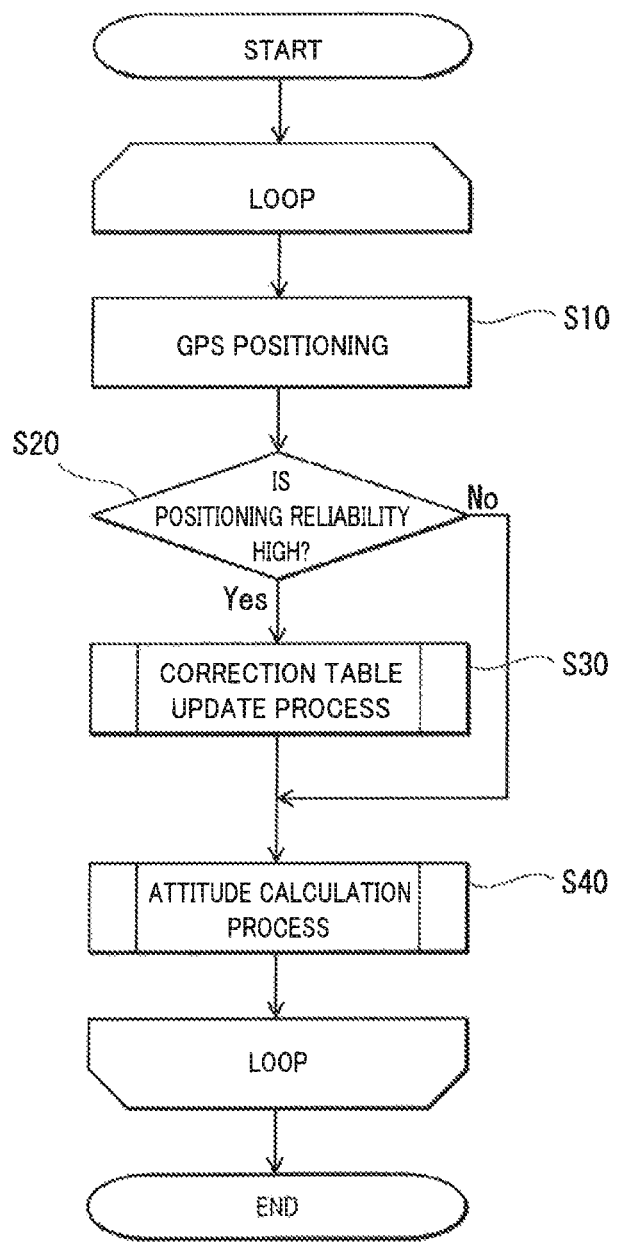
FIG. 5 is a flowchart of the whole method for detecting a boom attitude.

As illustrated in FIG. 5, boom attitude detection apparatus A first performs positioning of a position of a leading end of boom 13 by means of GPS device 20 (step S10). Next, boom attitude detection apparatus A determines whether or not reliability $Q_{gps}$ of positioning is high (step S20). When reliability $Q_{gps}$ of positioning is high, correction table update process (step S30) and attitude calculation process (step S40) as described below are performed. When reliability $Q_{gps}$ of positioning is low, correction table update process (step S30) is not performed and attitude calculation process (step S40) is performed. Boom attitude detection apparatus A repeats the above processes to calculate attitudes of boom 13 in real time.

Next, correction table update process (step S30) is described in detail.

Figure 6:
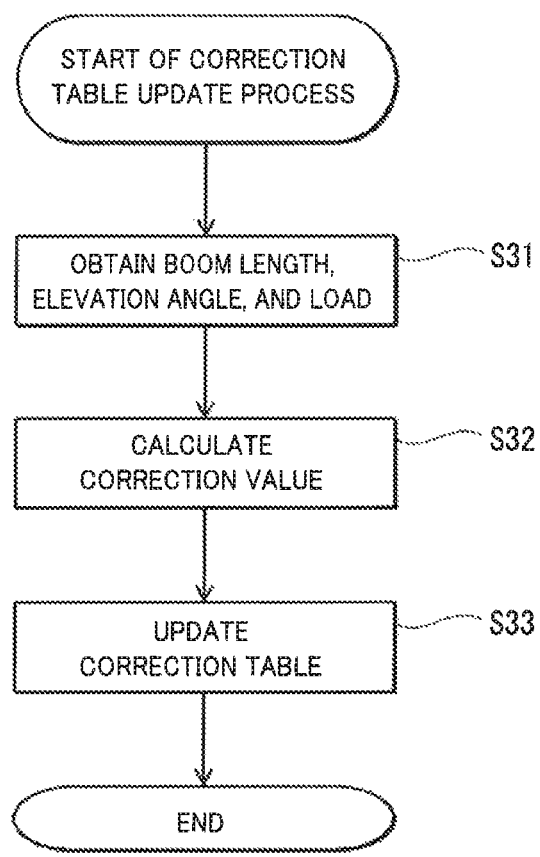
FIG. 6 is a flowchart of a correction table update process.

As illustrated in FIG. 6, calculation device 40 first obtains respective detection values ($L_{det}$, $\theta_{det}$, $W_{det}$) from length detector 31, elevation angle detector 32, and load detector 33 (step S31). Next, correction value calculation unit 41 calculates correction value ($\Delta L$, $\Delta \theta$) for correcting detection values ($L_{det}$, $\theta_{det}$) of attitude detectors 31, 32 to attitude ($L_{gps}$, $\theta_{gps}$) of boom 13 to be calculated from a positioning value of GPS device 20 (step S32). Next, correction table update unit 42 updates correction table 44 based on correction values ($\Delta L$, $\Delta \theta$) calculated by correction value calculation unit 41 (step S33).

Next, attitude calculation process (step S40) is described in detail.

Figure 7:
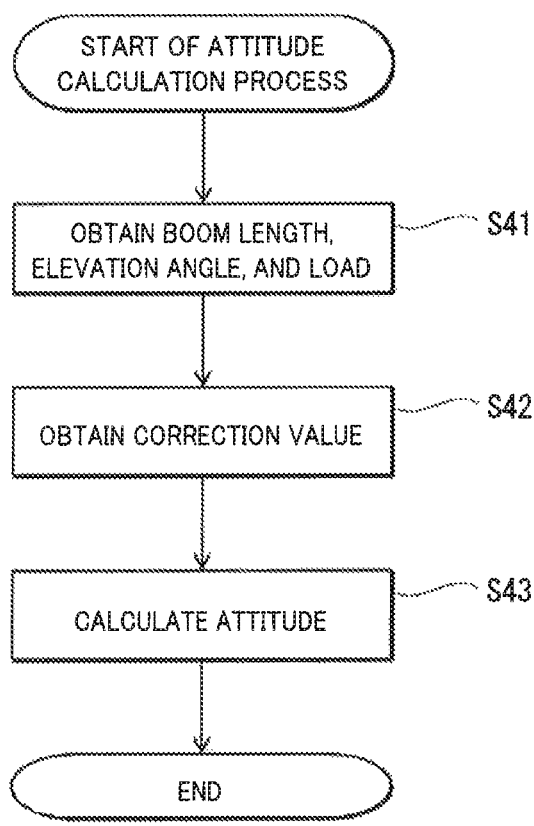
FIG. 7 is a flowchart of an attitude calculation process.

As illustrated in FIG. 7, calculation device 40 first obtains respective detection values ($L_{det}$, $\theta_{det}$, $W_{det}$) from length detector 31, elevation angle detector 32, and load detector 33 (step S41). Next, attitude calculation unit 43 obtains from correction table 44 correction values ($\Delta L'$, $\Delta \theta'$) corresponding to detection values ($L_{det}$, $\theta_{det}$, $W_{det}$) of detectors 31 to 33 (step S42). Attitude calculation unit 43 then corrects detection values ($L_{det}$, $\theta_{det}$) of attitude detectors 31, 32 by the obtained correction values ($\Delta L'$, $\Delta \theta'$) to calculate attitude ($R_{est}$, $H_{est}$) of boom 13 (step S43). Attitude calculation unit 43 also calculates reliability $Q_{est}$ of the calculated attitude of boom 13. Attitude ($R_{est}$, $H_{est}$) of boom 13 and reliability $Q_{est}$ thereof are then output.

As described above, detection values of attitude detectors 31, 32 are corrected for calculating an attitude of boom 13, so that the attitudes of boom 13 can be calculated even in a case where GPS device 20 is in poor condition to receive radio waves and reliability of positioning is low. Moreover, attitude detection with high accuracy is achieved by virtue of the ability to calculate an attitude of boom 13 in which bending of boom 13 is taken into account and which is close to the actual attitude. Accordingly, a device such as an overload prevention device or the like that operates based on an attitude of boom 13 is allowed to function regardless of conditions of GPS device 20 to receive radio waves, so that events such as suspension of a crane operation do not occur.

Moreover, because of the configuration in which correction values are obtained from correction table 44, the correction values are changed depending on an attitude of boom 13 and a load, so that an attitude of boom 13 can be calculated with high accuracy. Furthermore, correction values for an actual attitude of boom 13 and an actual load are calculated by interpolation of correction values obtained from correction table 44, so that it is possible to continuously change correction values depending on changes in the actual attitude of boom 13 and the actual load to continuously calculate attitudes of boom 13. Thus, calculated attitudes of boom 13 do not have any bad effect on other devices utilizing the calculated attitudes.

In addition, outputting reliability $Q_{est}$ of an calculated attitude of boom 13 makes it possible to prompt operators to suitable operations and to appropriately control other devices.

(Other Embodiments)

The configuration of GPS device 20 is not limited to the above embodiment, and may include a configuration in which base station GPS antenna 21 is placed at a known position on a ground surface or the like instead of on slewing base 12. In addition, the way of positioning by GPS device 20 is not limited to relative positioning, and may be point positioning as long as sufficient positioning accuracy can be achieved.

The configuration of the attitude detector is not limited to the configuration in which length detector 31 and elevation angle detector 32 are included, and the attitude detector may be configured to include only one of them. Length detector 31 is not required, for example, in a case where boom 13 does not extend and retract.

Correction table 44 is not limited to the table with three indices of boom length $L_i$, elevation angle $\theta_j$, and load $W_k$, and may be a table with two or one of the three indices. Elements having a greater effect on bending of boom 13 may be chosen as indices according to a crane configuration. By way of example, it is not necessary to choose boom length $L_i$ as an index in a case where boom 13 does not extend and retract. It is also not necessary to choose load $W_k$ as an index in a case where a load applied to boom 13 has a small effect on bending of boom 13. In this case, load detector 33 may also be dispensed with.

In the flowchart as illustrated in FIG. 5, steps sequentially proceed from GPS positioning (step S10) to attitude calculation (step S40). Instead, steps from GPS positioning (step S10) to correction table update (step S30) may proceed in parallel with attitude calculation (step S40).

REFERENCE SIGNS LIST

C mobile crane
11 traveling chassis
12 slewing base
13 boom
14 hook
A boom attitude detection apparatus
20 GPS device
21 base station GPS antenna
22 mobile station GPS antenna
23 base station GPS receiver
24 mobile station GPS receiver 25 positioning calculation unit
31 length detector
32 elevation angle detector
33 load detector
40 calculation device
41 correction value calculation unit
42 correction table update unit
43 attitude calculation unit
44 correction table

The invention claimed is:

1. A boom attitude detection apparatus that calculates an attitude of a boom of a crane, the boom attitude detection apparatus comprising:
 a GPS device that performs positioning of a position of a leading end of the boom;
 an attitude detector that detects an attitude of the boom;
 a load detector that detects a load applied to the boom; and
 a calculation device that receives a positioning value of the GPS device and detection values of the attitude detector and the load detector, wherein
 the calculation device
  stores therein a correction table in which a correction value per attitude of the boom and load applied to the boom is stored, and
  in a case where positioning reliability of the GPS device is high, the calculation device
   calculates a correction value for correcting a detection value of the attitude detector to an attitude of the boom to be calculated based on a positioning value of the GPS device, and
   updates, by the calculated correction value, correction values within the correction table corresponding to detection values of the attitude detector and the load detector, and
  in a case where positioning reliability of the GPS device is low, the calculation device
   obtains correction values corresponding to detection values of the attitude detector and the load detector from the correction table, and
   corrects a detection value of the attitude detector by the obtained correction values to calculate an attitude of the boom.

2. The boom attitude detection apparatus according to claim 1, wherein
 during calculation of an attitude of the boom, the calculation device
  obtains correction values corresponding to neighborhoods of detection values of the attitude detector and the load detector from the correction table,
  interpolates the obtained correction values to calculate correction values for detection values of the attitude detector and the load detector, and
  corrects a detection value of the attitude detector by the calculated correction values to calculate an attitude of the boom.

3. The boom attitude detection apparatus according to claim 1, wherein during calculation of an attitude of the boom, the calculation device determines reliability of the calculated attitude of the boom by whether or not the correction value obtained from the correction table is already updated.

4. The boom attitude detection apparatus according to claim 1, wherein the calculation device always corrects a detection value of the attitude detector by the correction value to calculate an attitude of the boom regardless of reliability of positioning by the GPS device.

* * * * *